United States Patent
Harada et al.

(10) Patent No.: US 9,903,942 B2
(45) Date of Patent: Feb. 27, 2018

(54) OBSTACLE DETECTION DEVICE

(71) Applicants: DENSO CORPORATION, Kariya, Aichi-pref (JP); NIPPON SOKEN, INC., Nishio, Aichi-pref (JP)

(72) Inventors: Taketo Harada, Kariya (JP); Mitsuyasu Matsuura, Nishio (JP); Keiko Akiyama, Nishio (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 157 days.

(21) Appl. No.: 14/787,735

(22) PCT Filed: Apr. 21, 2014

(86) PCT No.: PCT/JP2014/002218
§ 371 (c)(1),
(2) Date: Oct. 28, 2015

(87) PCT Pub. No.: WO2014/178173
PCT Pub. Date: Nov. 6, 2014

(65) Prior Publication Data
US 2016/0069990 A1 Mar. 10, 2016

(30) Foreign Application Priority Data
Apr. 30, 2013 (JP) .................. 2013-095775

(51) Int. Cl.
*G01S 7/00* (2006.01)
*G01S 7/539* (2006.01)
(Continued)

(52) U.S. Cl.
CPC .............. *G01S 7/539* (2013.01); *G01S 7/521* (2013.01); *G01S 15/08* (2013.01); *G01S 15/42* (2013.01);
(Continued)

(58) Field of Classification Search
CPC ........ B60Q 9/002; B60Q 9/006; B60Q 9/007; G01S 15/00; G01S 15/93
See application file for complete search history.

(56) References Cited

U.S. PATENT DOCUMENTS 6,021,373 A * 2/2000 Zuercher ................ B60Q 9/006
180/271
6,067,110 A * 5/2000 Nonaka .................... B60Q 1/52
348/148
(Continued)

FOREIGN PATENT DOCUMENTS

| JP | 2001-212189 A | 8/2001 |
| JP | 2010-230425 A | 10/2010 |
| WO | 2014/178173 A1 | 11/2014 |

OTHER PUBLICATIONS

International Search Report and Written Opinion dated Jun. 10, 2014 for the International Application No. PCT/JP2014/002218.

*Primary Examiner* — Hovhannes Baghdasaryan
(74) *Attorney, Agent, or Firm* — Knobbe, Martens, Olson & Bear, LLP

(57) ABSTRACT

An obstacle detection device includes a plurality of ultrasonic sensors and a detection control unit. The detection control unit detects an object by using one of at least two of the ultrasonic sensors as a transmission sensor that transmits an ultrasonic wave and the other of the at least two of the ultrasonic sensors as a reception sensor that receives the ultrasonic wave transmitted by the transmission sensor and reflected. A difference of heights of the one used as the transmission sensor and the other used as the reception sensor attached to a surface of a vehicle body from a ground is a predetermined threshold height that is defined based on twice a height of a bump on the ground as a non-detection object.

7 Claims, 7 Drawing Sheets

(51) Int. Cl.
*G01S 7/521* (2006.01)
*G01S 15/93* (2006.01)
*G01S 15/42* (2006.01)
*G01S 15/87* (2006.01)
*G01S 15/08* (2006.01)
G08G 1/16 (2006.01)

(52) U.S. Cl.
CPC .......... *G01S 15/876* (2013.01); *G01S 15/931* (2013.01); *G01S 2015/932* (2013.01); *G01S 2015/938* (2013.01); *G01S 2015/939* (2013.01); *G08G 1/165* (2013.01)

(56) References Cited

U.S. PATENT DOCUMENTS

| | | |
|---|---|---|
| 2005/0110620 A1 | 5/2005 | Takeichi et al. |
| 2005/0231341 A1* | 10/2005 | Shimizu ................. B60Q 9/005 340/436 |
| 2009/0009306 A1 | 1/2009 | Magane et al. |
| 2010/0220550 A1 | 9/2010 | Akiyama et al. |
| 2012/0327239 A1 | 12/2012 | Inoue et al. |
| 2013/0116905 A1* | 5/2013 | Lucking ................. B60Q 9/006 701/70 |

\* cited by examiner

OBSTACLE DETECTION DEVICE

CROSS REFERENCE TO RELATED APPLICATION

This application is based on Japanese Patent Application No. 2013-95775 filed on Apr. 30, 2013, the disclosure of which is incorporated herein by reference.

TECHNICAL FIELD

The present disclosure relates to an obstacle detection device that detects an obstacle around a vehicle using an ultrasonic wave.

BACKGROUND ART

An obstacle detection device as described in patent literature 1 has been proposed for detecting existence of an obstacle around a vehicle or a distance from the vehicle to the obstacle by using an ultrasonic wave. The obstacle detection device described in the patent literature 1 can use two different modes, one being a short distance mode having a broad directivity and the other being a long distance mode having a narrow directivity, by changing transmission frequency and transmission output of an ultrasonic sensor. As such, an obstacle in a short distance from the vehicle and an obstacle in a long distance from the vehicle can be both properly detected.

In a clearance sonar system or a parking assist system in which the above obstacle detection device is employed, it is important for a proper vehicle control to accurately discriminate between the obstacle that needs to be avoided from contacting and a low bump that needs not to be avoided, thereby to restrict unnecessary detection. To avoid the unnecessary detection in which the low bump is detected as the obstacle, as described in the patent literature 1, it has been considered to perform the detection by narrowing the directivity of the ultrasonic sensor in a vertical direction.

However, even when the directivity of the ultrasonic sensor is narrowed, a reaching range of the ultrasonic wave spreads especially as the distance between the obstacle and the vehicle increases. Therefore, there is no difference between reception intensity of a reflected wave reflected by a wall and reception intensity of a reflected wave reflected by the bump. In such a case, there is a possibility that it cannot be determined precisely whether a reception result of the ultrasonic sensor indicates the wall or the bump. As a result, there is a possibility that the bump, which needs not to be avoided, is detected as the wall when trying to detect the wall.

PRIOR ART LITERATURE

Patent Literature

Patent Literature 1: JP 2009-14560 A

SUMMARY OF INVENTION

It is an object of the present disclosure to provide an obstacle detection device capable of determining a bump accurately using ultrasonic sensors.

An obstacle detection device according to an aspect of the present disclosure includes a plurality of ultrasonic sensors and a detection control unit. The ultrasonic sensors detect an obstacle by transmitting an ultrasonic wave and receiving a reflected wave of the ultrasonic wave transmitted. The detection control unit detects the obstacle by using one of at least two of the ultrasonic sensors as a transmission sensor that transmits an ultrasonic wave and the other of the at least two of the ultrasonic sensors as a reception sensor that receives the ultrasonic wave transmitted from the transmission sensor and reflected. The ultrasonic sensor as the transmission sensor and the ultrasonic sensor as the reception sensor are attached to a surface of a vehicle body at different heights from a ground, so that a difference of the heights is a predetermined threshold height defined based on twice a height that is defined as a bump on the ground, which is a non-detection object not to be detected. The detection control unit determines that an object is the bump on the ground, which is the non-detection object, on condition that, when the transmission sensor transmits an ultrasonic wave to an area where the object exists, a reception result produced by the reception sensor does not satisfy a predetermined detection condition for detecting the obstacle.

The obstacle detection device according to the first aspect can accurately determine the bump on the ground, which is the non-detection object.

An obstacle detection device according to a second aspect includes a plurality of ultrasonic sensors and a detection control unit. The ultrasonic sensors detect an obstacle by transmitting an ultrasonic wave and receiving a reflected wave of the ultrasonic wave transmitted. The detection control unit detects the obstacle by using one of at least two of the ultrasonic sensors as a transmission sensor that transmits an ultrasonic wave and the other ultrasonic sensor as a reception sensor that receives the ultrasonic wave transmitted from the transmission sensor and reflected. The ultrasonic sensor as the transmission sensor and the ultrasonic sensor as the reception sensor are attached to a surface of a vehicle body at different heights from a ground, so that a difference of the heights is equal to or more than 10 cm. The detection control unit determines that an object is the bump on the ground, which is the non-detection object, on condition that, when the transmission sensor transmits an ultrasonic wave to an area where the object exists, a reception result produced by the reception sensor does not satisfy a predetermined detection condition for detecting the obstacle.

The obstacle detection device according to the second aspect can accurately determine the bump on the ground, which is the non-detection object.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Embodiments of the present disclosure will be described hereinafter with reference to the drawings. The present disclosure is not limited to the embodiments described hereinafter and can be implemented in various other ways.

[Explanation of Structure of Obstacle Detection Device]

Figure 1:
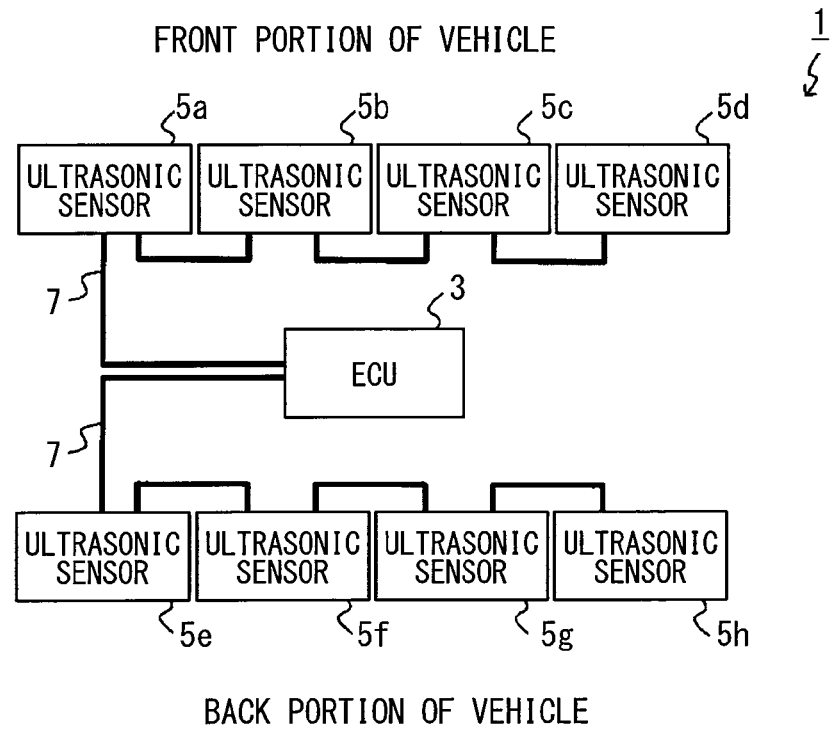
FIG. 1 is a block diagram illustrating an obstacle detection device according to an embodiment of the present disclosure.

As shown in FIG. 1, an obstacle detection device 1 has an ECU 3, eight ultrasonic sensors 5 and serial communication lines 7. Hereinafter, when the ultrasonic sensors 5 are distinguished from each other, the ultrasonic sensors 5 are referred to as ultrasonic sensors 5a to 5h.

Each of the ultrasonic sensors 5 detects an obstacle and measures a distance from the obstacle by transmitting an ultrasonic wave and receiving a reflected wave that hits against the obstacle and is reflected. The ultrasonic sensor 5 is constructed of a microphone, an electronic control circuit and a communication circuit, none of which are not illustrated. The electronic control circuit transmits/receives an ultrasonic wave by driving the microphone, detect the obstacle and calculate the distance. The communication circuit communicates with the ECU 3 through the serial communication lines 7.

The ultrasonic sensor 5 transmits an ultrasonic wave with a predetermined frequency by driving the microphone in accordance with control performed by the ECU 3 through the serial communication lines 7. When the ultrasonic wave transmitted is reflected by the obstacle, a reflected wave is received by the microphone. Then, a reception signal of the reflected wave is transmitted to the electronic control circuit. The reception signal transmitted is amplified and filtered in the electronic control circuit, and compared with a predetermined threshold voltage level for determining the obstacle. As a result of comparison, when a voltage level of the reception signal is higher than the threshold voltage level, a reception result indicating that the obstacle is detected is reported to the ECU 3. Alternatively, a structure, in which the voltage level of the reception signal amplified and filtered in the electronic control circuit is reported to the ECU 3 as the reception result, may be employed. In the electronic control circuit, the ultrasonic sensor 5 calculates the distance based on a required time from a time point the ultrasonic wave is transmitted to a time point the reflected wave is received. Accordingly, the ultrasonic sensor 5 acquires the distance to the obstacle.

The ultrasonic sensor 5 is controlled to detect the obstacle by receiving an ultrasonic wave transmitted by another ultrasonic sensor 5, which is paired, and reflected, in addition to an ultrasonic wave transmitted by itself and reflected. As such, transmission and reception of an ultrasonic wave can be executed by different ultrasonic sensors 5. Since the other structures and functions of the ultrasonic sensors 5 are similar to those of the well-known art, detailed description thereof are omitted.

Figure 2A:
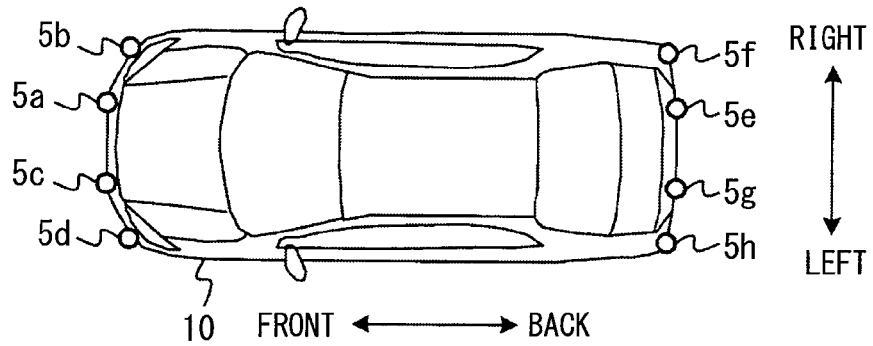
FIG. 2A is a top view illustrating attached positions of ultrasonic sensors.

For example, the ultrasonic sensors 5 are attached to a bumper of a vehicle 10. In the present embodiment, as shown in FIG. 2A, the ultrasonic sensors 5a to 5d are attached to a front portion of the vehicle 10 and transmit ultrasonic waves toward a front area of the vehicle 10. The ultrasonic sensors 5a and 5b are attached to a right section of the front portion of the vehicle 10. The ultrasonic sensors 5c and 5d are attached to a left section of the front portion of the vehicle 10. The ultrasonic sensors 5e to 5h are attached to a back portion of the vehicle 10 and transmit ultrasonic waves toward a back area of the vehicle 10. The ultrasonic sensors 5e and 5f are attached to a right section of the back portion of the vehicle 10. The ultrasonic sensors 5g and 5h are attached to a left section of the back portion of the vehicle 10.

Figure 2B:
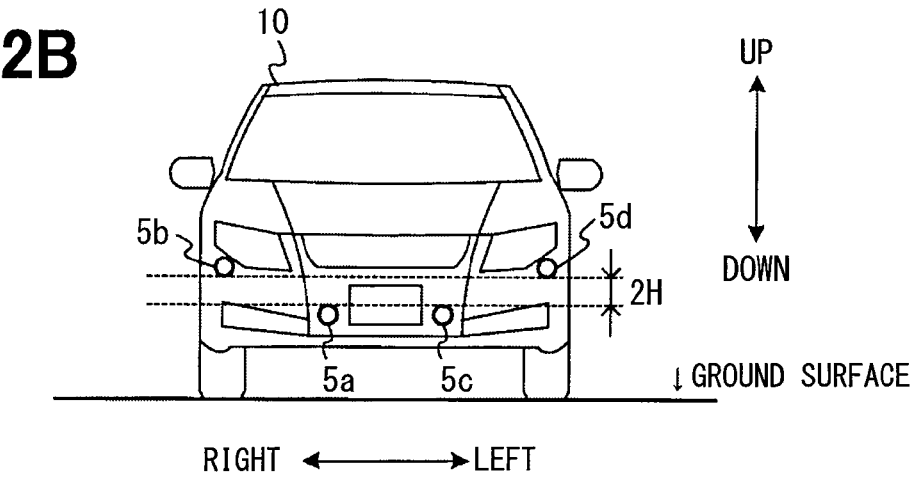
FIG. 2B is a front view illustrating the attached positions of the ultrasonic sensors.
Figure 2C:
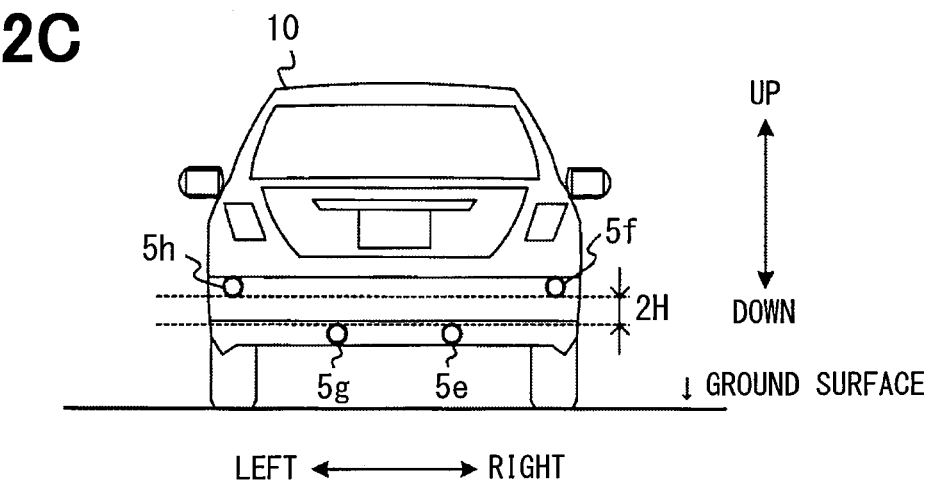
FIG. 2C is a back view illustrating the attached positions of the ultrasonic sensors.

As shown in FIG. 2B, the ultrasonic sensors 5b, 5d are attached to positions higher than the ultrasonic sensors 5a, 5c on the front portion of the vehicle 10. An interval between the lower ultrasonic sensors 5a, 5c and the upper ultrasonic sensors 5b, 5d corresponds to a height 2H in a vertical direction. As shown in FIG. 2C, the ultrasonic sensors 5f, 5h are attached to positions higher than the ultrasonic sensors 5e, 5g on the back portion of the vehicle 10. An interval between the lower ultrasonic sensors 5e, 5g and the upper ultrasonic sensors 5f, 5h corresponds to the height 2H in the vertical direction.

In this case, a height H corresponds to a height of a bump, such as a curbstone, on a ground surface, the bump being defined as a non-detection object that is not to be detected in a clearance sonar system or a parking assist system to which the obstacle detection device is employed. That is, the interval between the upper ultrasonic sensors 5 and the lower ultrasonic sensors 5 in the vertical direction on the front portion and the back portion of the vehicle 10 is twice the height of the bump as the non-detection object. It is not always necessary that the interval between the upper ultrasonic sensors 5 and the lower ultrasonic sensors 5 in the vertical direction is exactly 2H. The interval may be slightly larger than 2H in an allowable range of error and detection accuracy may have a margin. The height of the non-detection object is equal to or more than 5 cm, preferably, equal to or more than 10 cm. Therefore, when the height of the non-detection object is 5 cm, the interval between the upper ultrasonic sensors 5 and the lower ultrasonic sensors 5 in the vertical direction is equal to or more than 10 cm. When the ultrasonic sensors 5 are attached to the bumper of the vehicle 10, the interval between the upper ultrasonic sensors 5 and the lower ultrasonic sensors 5 in the vertical direction is shorter than a dimension of the bumper in the vertical direction.

Figure 3A:
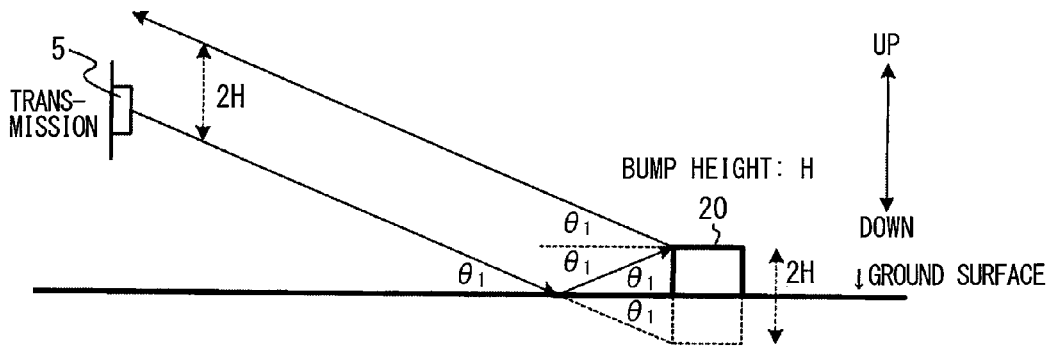
FIG. 3A is a diagram illustrating an example of a route of an ultrasonic wave reflected by the ground and a bump.
Figure 3B:
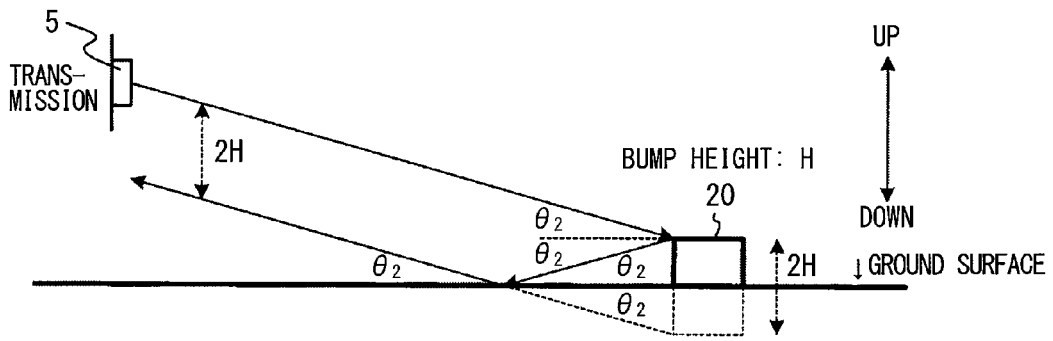
FIG. 3B is a diagram illustrating an example of a route of an ultrasonic wave reflected by a bump and the ground.

As shown in FIG. 3A, an ultrasonic wave that is transmitted from the ultrasonic sensor 5 (transmission sensor) disposed on the surface of a vehicle body, reflected on the ground surface once and further reflected by the bump 20 with the height H returns to a position within a range of the height 2H above a transmission position from which the ultrasonic wave is transmitted. As shown in FIG. 3B, an ultrasonic wave that is transmitted from the ultrasonic sensor 5 (transmission sensor) disposed on the surface of the vehicle body, reflected by the bump 20 with the height H, and further reflected by the ground surface returns to a position within a range of the height 2H below the transmission position.

Figure 3C:
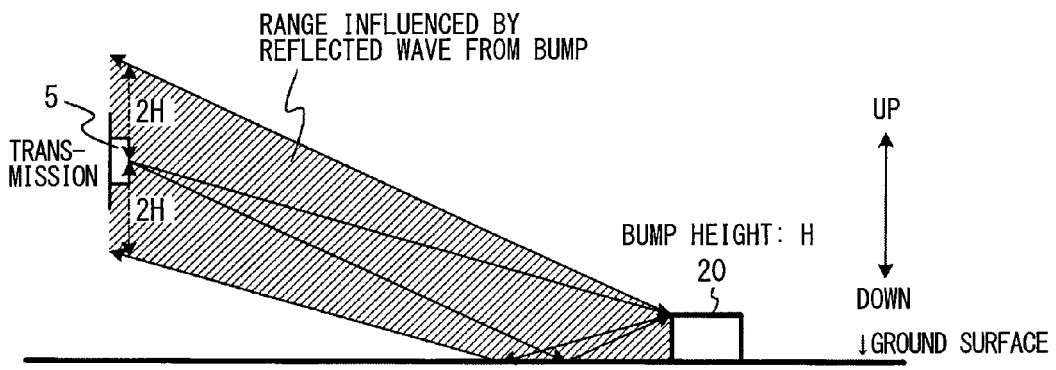
FIG. 3C is a diagram illustrating an example of a range influenced by a reflected wave reflected by a bump.

That is, as shown in FIG. 3C, an influenced range, in which the reflected wave reflected by the bump 20 with the height H is detected, is from a position higher than the transmission position by the height 2H to a position lower than the transmission position by the height 2H in the vertical direction including the transmission position. Therefore, when a reception sensor is in the influenced range, there is a possibility that the bump on the ground surface is unexpectedly detected as the obstacle. Conversely, when the reception sensor is attached at a height outside of the influenced range, the bump is not detected by the reception sensor.

In the present embodiment, as shown in FIG. 2B and FIG. 2C, the interval corresponding to the height 2H is provided between the upper ultrasonic sensor 5 and the lower ultrasonic sensor 5, so that another ultrasonic sensor 5, which is above (or below) the ultrasonic sensor 5 transmitting the ultrasonic wave, is out of the influenced range that is influenced by the reflected wave reflected by the bump with the height H. As such, the ultrasonic sensor 5, which is above (or below) the ultrasonic sensor 5 transmitting, does not receive the reflected wave of the ultrasonic wave transmitted and reflected by the bump with the height H. The ultrasonic sensor 5, which is above (or below) the ultrasonic sensor 5 transmitting, can receive a reflected wave reflected by an obstacle higher than the height H. That is, an object can be distinguished as the bump as the non-detection object, on condition that the ultrasonic sensor 5, which is above (or below) the ultrasonic sensor 5 transmitting, does not receive the reflected wave reflected by the object.

In the present embodiment, when the bump as the non-detection object is distinguished, especially, the lower ultrasonic sensors 5a, 5c, 5e and 5g are used as the transmission sensors transmitting ultrasonic waves. The upper ultrasonic sensors 5b, 5d, 5f and 5h are used as the reception sensors receiving the ultrasonic waves transmitted by the transmission sensors and reflected. The reasons will be hereinafter described.

Figure 4:
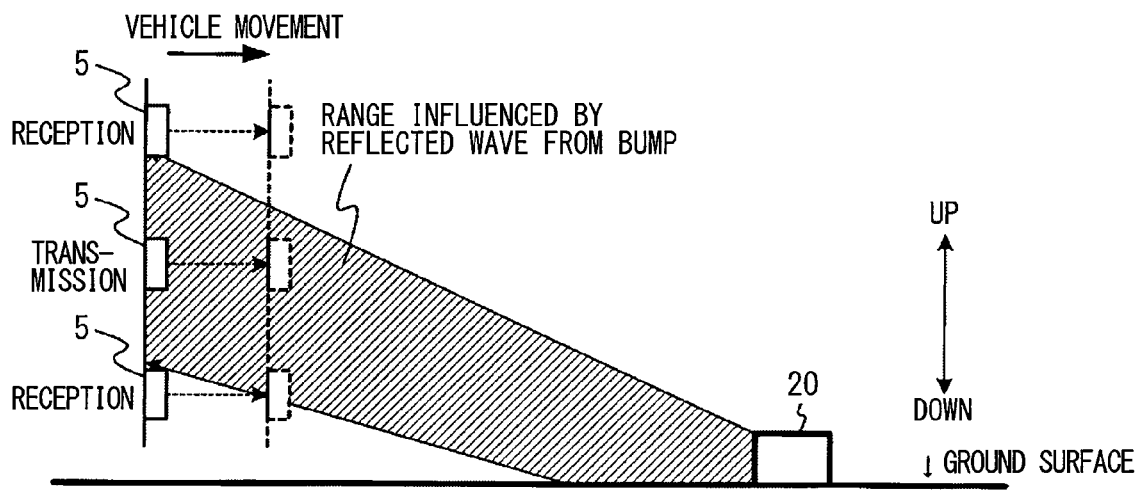
FIG. 4 is an explanatory diagram illustrating a change of reception positions in accordance with a vehicle movement.

As shown in FIG. 4, it is assumed a case where, when the vehicle is approaching the bump 20, an ultrasonic wave transmitted by the ultrasonic sensor 5 (transmission sensor) is reflected by the bump 20 and returns toward the vehicle. In a case where the reception sensor 5 is located higher than the transmission sensor 5, the reception sensor 5 is out of the influenced range of the reflected wave reflected by the bump at a time point the ultrasonic wave transmitted and reflected reaches the vehicle approaching the bump. Therefore, unnecessary detection of the bump can be restricted. On the other hand, in a case where the reception sensor 5 is located lower than the transmission sensor 5 and is out of the influenced range at a time point the ultrasonic wave is transmitted, there is a possibility that the reception sensor 5 is in the influenced range at a time point the reflected wave reaches the vehicle. In this case, there is a possibility that the bump is unnecessarily detected. As a result, using the lower ultrasonic sensors 5a, 5c, 5e and 5g as the transmission sensors and the upper ultrasonic sensors 5b, 5d, 5f and 5h as the reception sensors is advantageous for restricting the unnecessary detection of the bump when the vehicle is approaching the bump.

The description returns to the block diagram of FIG. 1. The ECU 3 is an electronic control unit that detects the obstacle around the vehicle by controlling the ultrasonic sensors 5. When the clearance sonar system or the parking assist system is in operation, the ECU 3 commands the respective ultrasonic sensors 5 to transmit and receive ultrasonic waves. The ECU 3 determines existence of the obstacle based on detection results received from the ultrasonic sensors 5. Control of the ultrasonic sensors 5 is performed by communication through the serial communication lines 7.

Figure 5:
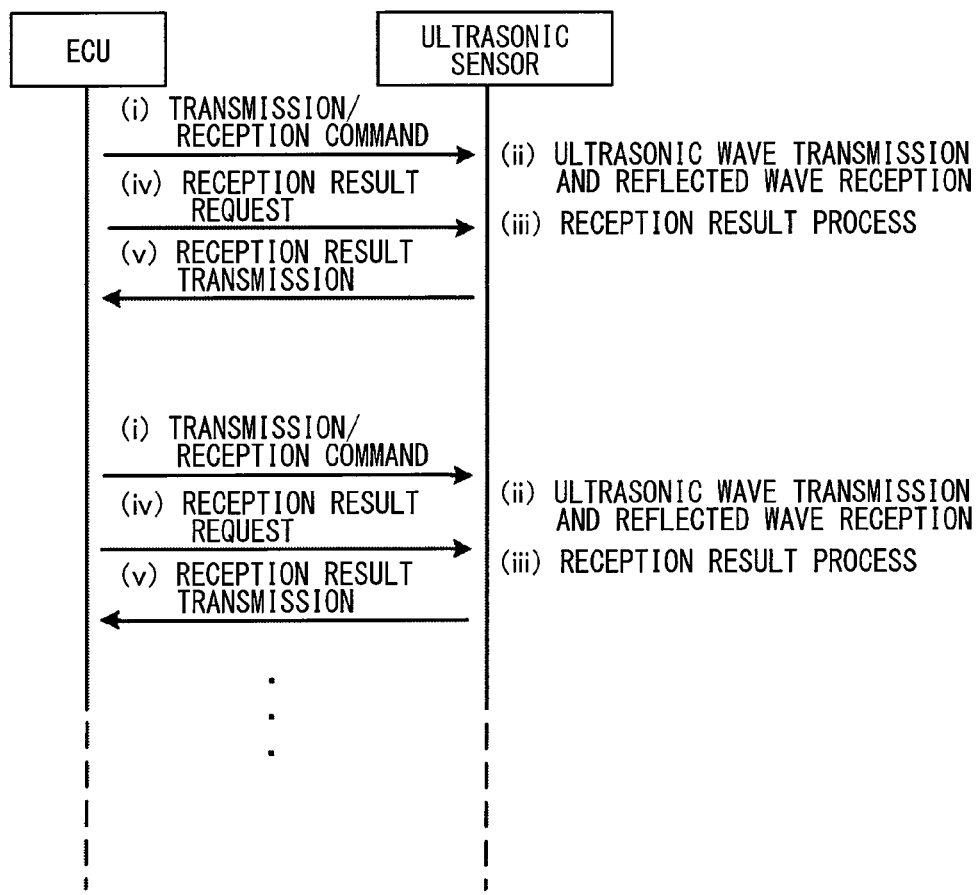
FIG. 5 is a sequence diagram illustrating a processing procedure of the obstacle detection device.

Specifically, as shown in the sequence diagram of FIG. 5, (i) the ECU 3 commands each of the plural ultrasonic sensors 5 to transmit or receive an ultrasonic wave. In the present embodiment, any two of the ultrasonic sensors 5 are commanded to transmit and receive an ultrasonic wave as a set (combination). Combinations of the two ultrasonic sensors are the ultrasonic sensors 5a, 5b, the ultrasonic sensors 5c, 5d, the ultrasonic sensors 5e, 5f and the ultrasonic sensors 5g, 5h. (ii) The ultrasonic sensor 5, which is commanded by the ECU 3, transmit or receive the ultrasonic wave. (iii) The ultrasonic sensor 5 processes a reception result of a reflected wave and calculates a detection result of the obstacle and distance to the obstacle. (iv) The ECU 3 requests the ultrasonic sensor 5, which is commanded to transmit or receive the ultrasonic wave, to transmit the reception result of the reflected wave. (v) The ultrasonic sensor 5, which is requested, transmits existence of the obstacle and the distance to the obstacle calculated based on the reception result of the reflected wave to the ECU 3.

The ECU 3 repeats the above processing (i) to (v) while changing the combination of the ultrasonic sensors 5 transmitting and receiving the ultrasonic wave. For example, the obstacle is detected using the combination of the ultrasonic sensors 5a, 5b at first, next the obstacle is detected using the combination of the ultrasonic sensors 5c, 5d, next the obstacle is detected using the combination of the ultrasonic sensors 5e, 5f and next the obstacle is detected using the combination of the ultrasonic sensors 5g and 5h. As such, detection is performed several times. The ECU 3 executes a bump determination processing to determine whether the object is the obstacle that is to be detected or the bump as the non-detection object in the sequential detections. Detailed procedure of the bump determination processing will be described later.

[Description of Bump Determination Processing]

Figure 6:
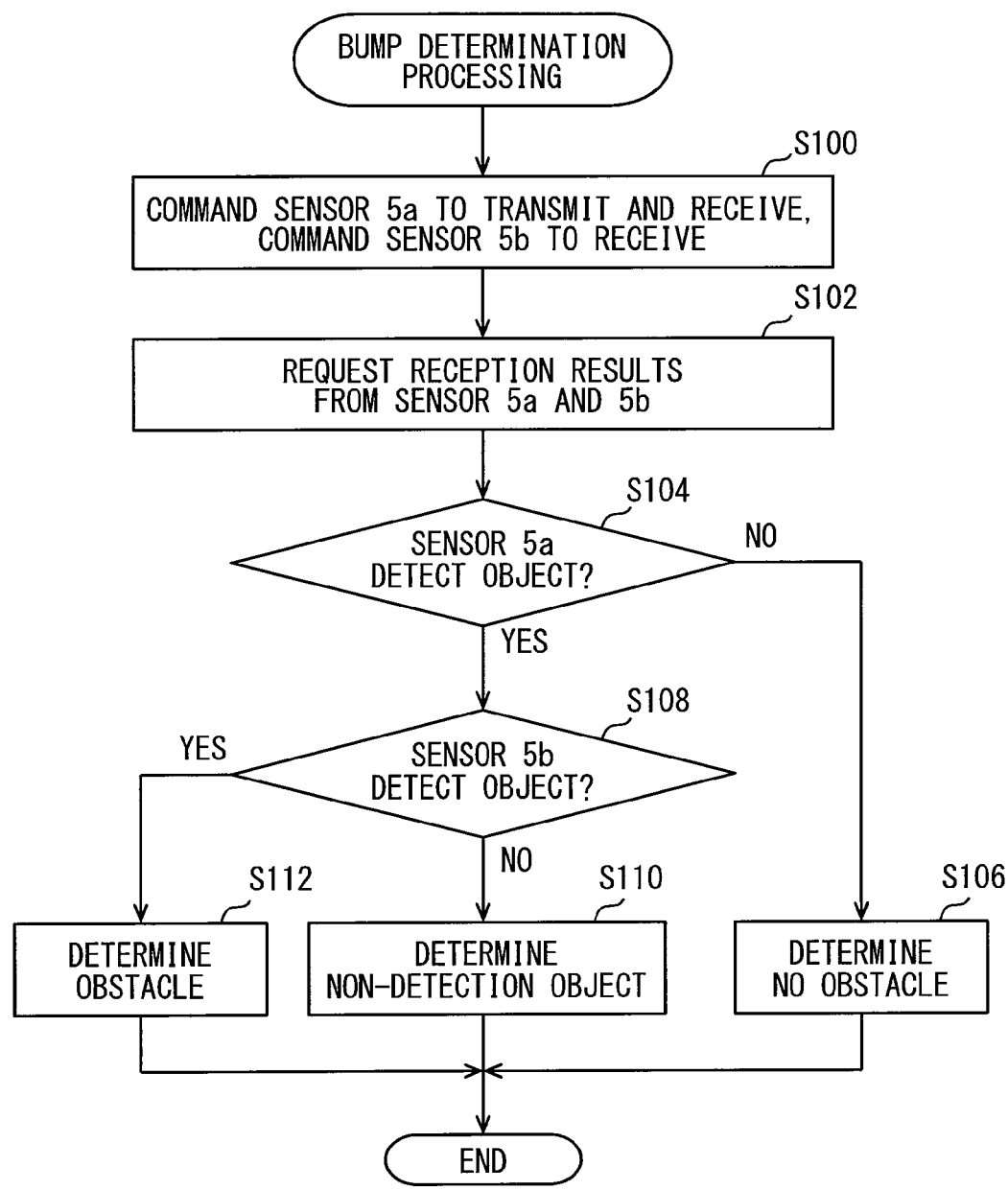
FIG. 6 is a flowchart illustrating a procedure of a bump determination processing.

The procedure of the bump determination processing, which is executed by the ECU 3 when the clearance sonar system or the parking assist system is in operation, will be described with reference to the flowchart of FIG. 6. The flowchart of FIG. 6 illustrates a processing procedure in which the ultrasonic sensors 5a, 5b are controlled as an example.

At S100, the ECU 3 commands the lower ultrasonic sensor 5a to transmit an ultrasonic wave and to receive a reflected wave thereof. Also, the ECU 3 commands the upper ultrasonic sensor 5b to receive the reflected wave of the ultrasonic wave transmitted by the ultrasonic sensor 5a. In this case, the ultrasonic sensor 5a is used as the transmission sensor and the ultrasonic sensor 5b is used as the reception sensor. The ultrasonic sensor 5a used as the transmission sensor is also controlled to receive the reflected wave transmitted by itself.

At next S102, the ECU 3 requests the ultrasonic sensors 5a, 5b to transmit the reception results of the reflected waves. The ECU 3 receives the reception results transmitted from the ultrasonic sensors 5a, 5b. In this case, for example, the ECU 3 receives information, as the reception result, indicating the result of determination of the existence of the obstacle by each of the ultrasonic sensors 5a, 5b based on a voltage level of the reception signal of the reflected wave. Alternatively, the ECU 3 may receive information, as the reception result, indicating the voltage level of the reception signal of the reflected wave received by the ultrasonic sensor 5.

At S104, the ECU 3 determines whether the reception result received from the ultrasonic sensor 5a at S102 indicates that the obstacle has been detected. Specifically, the ECU 3 makes positive determination when the reception result received from the ultrasonic sensor 5a indicates that the obstacle exists. The ECU 3 makes negative determination when the reception result received from the ultrasonic sensor 5a indicates that the obstacle does not exist. In the structure where the ECU 3 receives the reception result indicating the voltage level of the reception signal, the ECU 3 compares the voltage level of the reception signal with the threshold voltage level for determining the obstacle. As a result of comparison, the ECU 3 makes the positive determination when the voltage level of the reception signal is higher than the threshold voltage level, and makes the negative determination when the voltage level of the reception signal is equal to or lower than the threshold voltage level.

When the reception result received from the ultrasonic sensor 5a indicates that the obstacle is not detected (S104: NO), the ECU 3 proceeds to S106. At S106, the ECU 3 determines that there is no obstacle in a transmission area to which the ultrasonic sensor 5a transmits the ultrasonic wave, and finishes the bump determination processing. In contrast, when the reception result received from the ultrasonic sensor 5a indicates that the obstacle is detected (S104: YES), the ECU 3 proceeds to S108. At S108, the ECU 3 determines whether the reception result received from the ultrasonic sensor 5b at S102 indicates that the obstacle is detected. Specific determination method is similar to that of S104.

When the reception result received from the ultrasonic sensor 5b indicates that the obstacle is not detected (S108: NO), the ECU 3 proceeds to S110. At S110, the ECU 3 determines the object detected by the ultrasonic sensor 5a as the bump, which is the non-detection object, and finishes the processing. In contrast, when the reception result received by the ultrasonic sensor 5b indicates that the obstacle is detected (S108: YES), the ECU 3 proceeds to S112. At S112, the ECU 3 determines the object detected by the ultrasonic sensor 5a as the obstacle that is to be detected (for example, a wall or the like) and finishes the processing.

The above description of the bump determination processing is an example in which two ultrasonic sensors 5a, 5b are used. The procedures are similar when the bump determination processing is executed using the combination of the ultrasonic sensors 5c, 5d, the ultrasonic sensors 5e, 5f or the ultrasonic sensors 5g, 5h.

[Means that can be Employed in Bump Determination Processing]

Generally, a reception sensitivity of the ultrasonic sensor is the highest in a front direction of the microphone used as a reception element. It is known that the reception sensitivity of the ultrasonic sensor shows a reception directional characteristic that attenuates exponentially in an oblique direction of the microphone according to an angle of the direction relative to the front direction. In the obstacle detection device 1 of the present invention, the reception sensitivity of the reception sensor largely influences accuracy of determining the bump. As means to improve the accuracy of determining the bump, it can be considered to correct an attenuation of the reception sensitivity when a reflected wave enters the reception sensor from the oblique direction in the horizontal direction, and to determine whether the object is the obstacle or the bump as the non-detection object.

Figure 7:
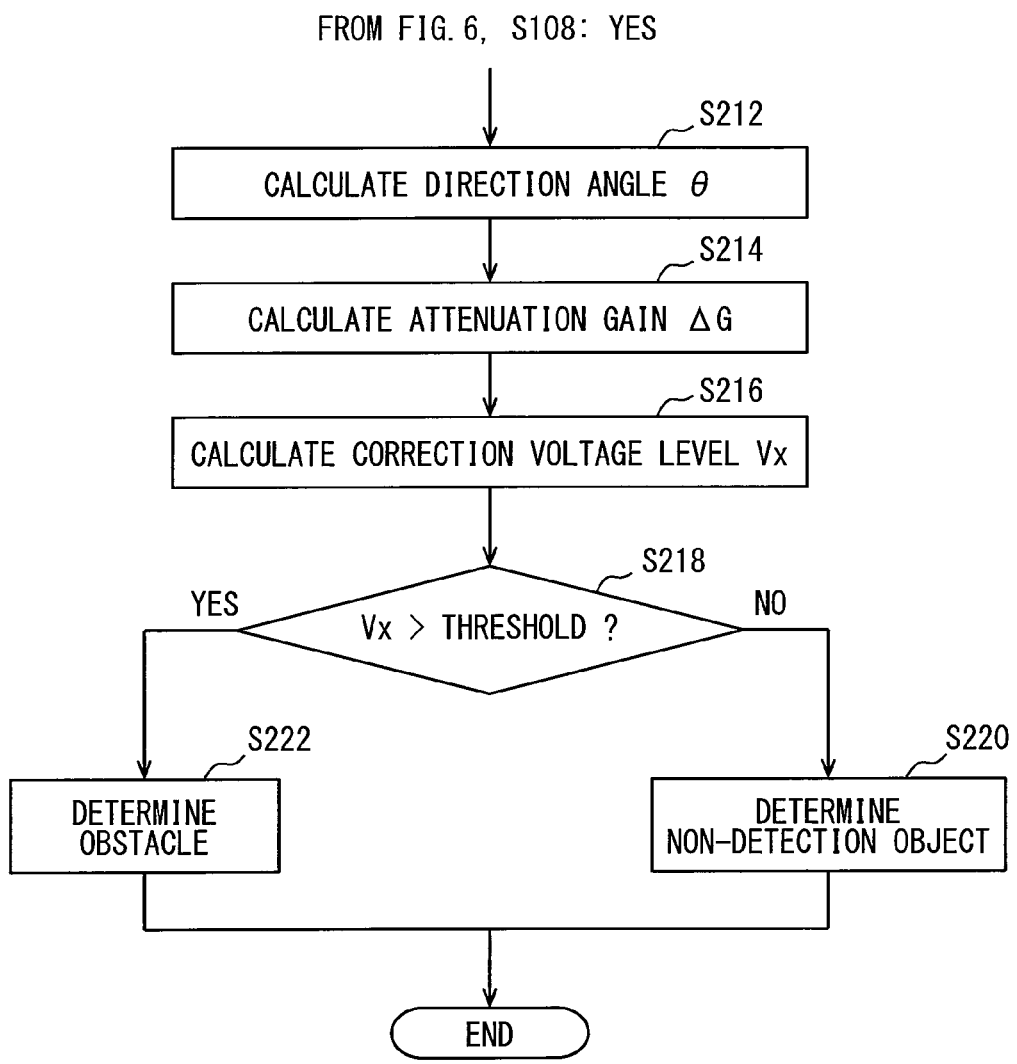
FIG. 7 is a flowchart illustrating a procedure of a modification of a bump determination processing.

Specific procedure will be hereinafter described with reference to the flowchart of FIG. 7. The sequential procedure shown in FIG. 7 is assumed to be executed instead of the processing S112 when the positive determination is made at S108 in the above bump determination processing (see FIG. 6).

At S212 to which the ECU 3 proceeds when the positive determination is made at S108, the ECU 3 obtains measurement results of the distances produced by the ultrasonic sensors 5a, 5b and executes an arithmetic processing of trigonometry using the distances between the detected object and the ultrasonic sensors 5a, 5b and a distance between the ultrasonic sensor 5a and the ultrasonic sensor 5b. The arithmetic processing calculates a direction angle $\theta$ of a horizontal component of the object relative to the front direction of the ultrasonic sensor 5b.

Figure 8A:
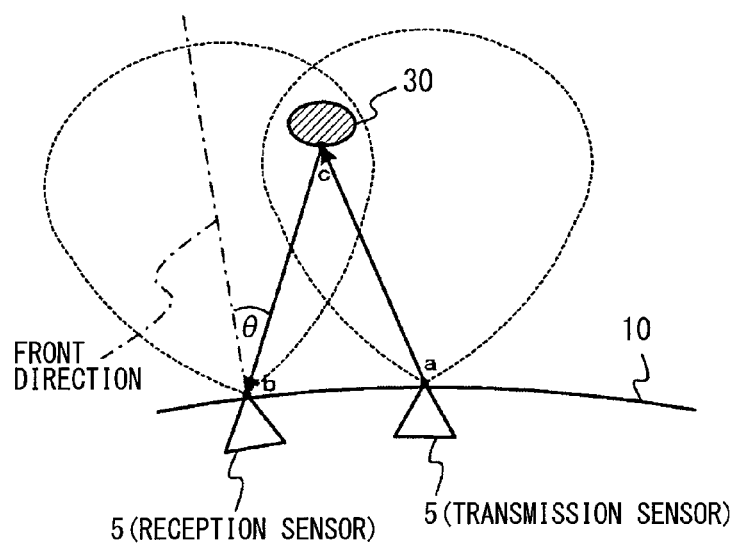
FIG. 8A is an explanatory diagram illustrating a method for calculating a direction angle of a horizontal component of an obstacle.

An example of a method for calculating the direction angle $\theta$ will be described based on a case of FIG. 8A. As shown in FIG. 8A, a distance ac between the transmission sensor and an object 30 is calculated based on a required time from a time point the transmission sensor transmits the ultrasonic wave to a time point the transmission sensor detects the reflected wave. A distance of a route passing through the points a, c and b is calculated based on a required time from the time point the transmission sensor transmits the ultrasonic wave to a time point the reception sensor detects the reflected wave. A distance be between the reception sensor and the object 30 is calculated by subtracting the distance ac from the distance of the route passing through the points a, c and b.

The distance ab between the transmission sensor and the reception sensor is defined as a default value in advance. Since length of three sides of a triangle abc connecting the transmission sensor, the reception sensor and the object is specified, the angle abc (interior angle of a vertex b) can be calculated using a trilateration principle. The direction angle $\theta$ of the horizontal component of the object relative to the front direction of the reception sensor can be calculated from the angle abc and an angle formed by the side ab and the front direction of the reception sensor.

Figure 8B:
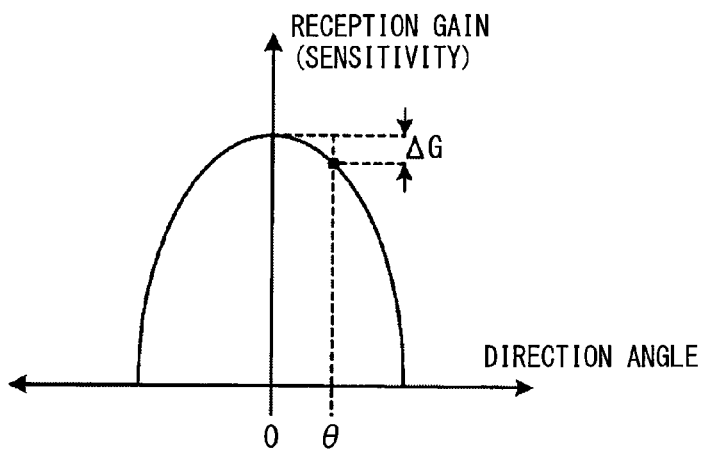
FIG. 8B is an explanatory diagram illustrating a method for calculating an attenuation gain AG.

The description returns to the flowchart of FIG. 7. At S214, the ECU 3 calculates an attenuation gain AG of the reception sensitivity corresponding to the direction angle $\theta$ of the object calculated at S212. The direction angle $\theta$ is calculated based on the reception directional characteristic of the ultrasonic sensor 5b in the horizontal direction. Specifically, the reception directional characteristic of the ultrasonic sensors 5 in the horizontal direction as shown in FIG. 8B is stored in the ECU 3 in advance. The reception directional characteristic indicates that a reception gain (sensitivity) of a reflected wave attenuates exponentially with respect to the direction angle of the horizontal component relative to the front direction of the ultrasonic sensors 5. The ECU 3 calculates a difference between a peak value of the reception gain corresponding to direction angle 0° (front direction) and the reception gain corresponding to the direction angle $\theta$ of the object. The difference is defined as the attenuation gain $\Delta G$.

The description returns to the flowchart of FIG. 7. At S216, the ECU 3 calculates a correction voltage level Vx. The correction voltage level Vx is calculated by reflecting the attenuation gain $\Delta G$ calculated at S214 in the voltage level V of the reception signal of the reflected wave obtained from the ultrasonic sensor 5b. In the reception directional characteristic showing the exponential attenuation, the attenuation gain ΔG, the voltage level V of the reception signal of the reflected wave and the correction voltage level Vx have a relation as expressed by Formula (1). When Formula (1) is transformed, the correction voltage level Vx can be expressed as shown in Formula (2). When the known voltage level V and the attenuation gain ΔG are substituted in Formula (2), the correction voltage level Vx can be calculated.

[Formula 1]

$$\Delta G = 20\log\frac{V_x}{V} \quad (1)$$

[Formula 2]

$$V_x = Ve^{\frac{\Delta G}{20}} \quad (2)$$

At next S218, the ECU 3 compares the correction voltage level Vx calculated at S216 and the predetermined threshold voltage level for detecting the obstacle. The ECU 3 determines whether the correction voltage level Vx is higher than the threshold voltage level. When the correction voltage level Vx is equal to or lower than the threshold voltage level (S218: NO), the ECU 3 proceeds to S220. At S220, the ECU 3 determines that the object detected by the ultrasonic sensor 5a is the bump as the non-detection object and finishes the processing. In contrast, when the correction voltage level Vx is higher than the threshold voltage level (S218: YES), the ECU 3 proceeds to S222. At S222, the ECU 3 determines that the object detected by the ultrasonic sensor 5a is the obstacle to be detected (for example, a wall or the like) and finishes the processing.

[Modification]

In the above embodiment, the example, in which, among the plural ultrasonic sensors 5 attached to the upper portion and the lower portion of the vehicle, the lower ultrasonic sensors 5a, 5c, 5e and 5g are used as the transmission sensors and the upper ultrasonic sensors 5b, 5d, 5f, 5h are used as the reception sensors to execute the bump determination processing, is described. As another example, two of the ultrasonic sensors 5 attached to the upper portion and the lower portion may detect the obstacle several times while changing the transmission sensor and the reception sensor between them. Specifically, in the processing sequence shown in FIG. 5, the ECU 3 first detects the object by using one of the upper and lower ultrasonic sensors 5 as the transmission sensor and the other of the upper and lower ultrasonic sensors 5 as the reception sensor. Next, the ECU 3 detects the object again by using the one as the reception sensor and the other as the transmission sensor. When the several times of the reception results indicate that the object is not detected by any reception sensors, the object is determined as the bump on the ground, which is the non-detection object.

According to the embodiments described above, the obstacle detection device 1 achieves the following effects. The ultrasonic sensors 5 are attached to respective positions of the vehicle 10 so that the difference between the height of the upper ultrasonic sensor 5 (reception sensor) and the height of the lower ultrasonic sensor 5 (transmission sensor) is the threshold height based on twice the height H of the bump, which needs to be avoided from being detected unnecessarily. As such, in the structure where the plural ultrasonic sensors 5 are attached to the upper portion and the lower portion, and the transmission and the reception of the ultrasonic waves are shared by the different ultrasonic sensors 5 at the upper portion and the lower portion, the bump can be accurately determined by a simple logic.

Based on the reception result that the ultrasonic sensor 5 used as the transmission sensor has received the reflected wave of the ultrasonic wave transmitted from itself, the object, which is to be determined whether to be the obstacle or the bump, can be detected. Further, based on the reception result that the ultrasonic sensor 5 used as the reception sensor 5 has received the reflected wave of the ultrasonic wave transmitted from the different ultrasonic sensor used as the transmission sensor, it can be determined whether the object that has been detected by the transmission sensor is the obstacle or the bump as the non-detection object.

In the case where the lower ultrasonic sensors 5a, 5c, 5e and 5g are used as the transmission sensors and the upper ultrasonic sensors 5b, 5d, 5f and 5h are used as the reception sensors, it is advantageous to avoid unnecessary detection of the bump in a situation where the vehicle is approaching the bump.

In the case where the upper and lower two ultrasonic sensors 5 are used to execute several times of obstacle detections while changing the transmission sensor and the reception sensor between them, reliability of the detection results improves.

In the case where it is determined whether the reception sensor has detected the obstacle after correcting the reception sensitivity of the reception sensor according to the direction angle of the object relative to the front direction, the obstacle and the bump can be accurately determined.

The invention claimed is:

1. An obstacle detection device comprising:
a plurality of ultrasonic sensors transmitting an ultrasonic wave and receiving a reflected wave of the ultrasonic wave transmitted; and
a detection control unit detecting an object using one of at least two of the ultrasonic sensors as a transmission sensor that transmits an ultrasonic wave and the other of the at least two of the ultrasonic sensors as a reception sensor that receives the ultrasonic wave transmitted by the transmission sensor and reflected, wherein
the ultrasonic sensor used as the transmission sensor and the ultrasonic sensor used as the reception sensor are attached to a surface of a vehicle body at different heights from a ground so that a difference of the heights between the ultrasonic sensor used as the transmission sensor and the ultrasonic sensor used as the reception sensor is twice or more a predetermined threshold height to distinguish an obstacle and a bump on the ground as a non-detection object, the obstacle having a height greater than the predetermined threshold height, and the bump on the ground having a height equal to or less than the predetermined threshold height,
the detection control unit determines that the object is the obstacle when the transmission sensor transmits the ultrasonic wave to an area where the object exists and a reception result received from the reception sensor satisfies a predetermined detection condition for detecting the obstacle, and
the detection control unit determines that the object is the bump on the ground as the non-detection object when the transmission sensor transmits the ultrasonic wave to the area where the object exists and the reception result received from the reception sensor does not satisfy the predetermined detection condition for detecting the obstacle, wherein the predetermined detection condition comprises a condition that a voltage level of a reception signal of the ultrasonic wave received by the reception sensor is greater than a threshold voltage level.

2. The obstacle detection device according to claim 1, wherein the bump on the ground as the non-detection object includes a curbstone.

3. The obstacle detection device according to claim 1, wherein the detection control unit controls both the transmission sensor and the reception sensor to receive the ultrasonic wave transmitted by the transmission sensor and reflected, and the detection control unit specifies that the object exists when a reception result received from the transmission sensor satisfies the predetermined detection condition for detecting the obstacle, wherein the predetermined detection condition comprises a condition that a voltage level of a reception signal of the ultrasonic wave received by the transmission sensor is greater than a threshold voltage level, and when the detection control unit specifies that the object exists, the detection control unit determines whether the object specified is the obstacle or the bump on the ground as the non-detection object.

4. The obstacle detection device according to claim 1, wherein the one of the at least two of the ultrasonic sensors used as the transmission sensor is located lower than the other of the at least two of the ultrasonic sensors used as the reception sensor.

5. The obstacle detection device according to claim 1, wherein the detection control unit detects the object by using the one of the at least two of the ultrasonic sensors as the transmission sensor and the other of the at least two of the ultrasonic sensors as the reception sensor, the detection control unit detects the object again by using the one as the reception sensor and the other as the transmission sensor, and the detection control unit determines that the object is the bump on the ground as the non-detection object, on condition that a plurality of reception results produced by the reception sensor do not satisfy the predetermined detection condition for detecting the obstacle.

6. The obstacle detection device according to claim 1, further comprising:

an acquisition unit acquiring a direction angle of a horizontal component of the object relative to a front direction of the reception sensor; and a correction unit correcting an attenuation of a reception intensity of the reception sensor due to a directional characteristic of the reception sensor in a horizontal direction according to the direction angle of the object acquired by the acquisition unit, wherein the detection control unit determines whether the reception intensity corrected by the correction unit satisfies the predetermined detection condition for detecting the obstacle, and the detection control unit determines that the object is the bump on the ground as the non-detection object, on condition that the reception intensity corrected does not satisfy the predetermined detection condition.

7. An obstacle detection device comprising:

a plurality of ultrasonic sensors detecting an obstacle by transmitting an ultrasonic wave and receiving a reflected wave of the ultrasonic wave transmitted; and a detection control unit detecting an object using one of at least two of the ultrasonic sensors as a transmission sensor that transmits an ultrasonic wave and the other of the at least two of the ultrasonic sensors as a reception sensor that receives the ultrasonic wave transmitted by the transmission sensor and reflected, wherein the ultrasonic sensor used as the transmission sensor and the ultrasonic sensor used as the reception sensor are attached to a surface of a vehicle body at different heights from a ground so that a difference of the heights between the ultrasonic sensor used as the transmission sensor and the ultrasonic sensor used as the reception sensor is equal to or more than 10 cm, the detection control unit determines that the object is the obstacle when the transmission sensor transmits the ultrasonic wave to an area where the object exists and a reception result received from the reception sensor satisfies a predetermined detection condition for detecting the obstacle, and the detection control unit determines that the object is a bump on the ground as a non-detection object when the transmission sensor transmits the ultrasonic wave to the area where the object exists, and the reception result received from the reception sensor does not satisfy the predetermined detection condition for detecting the obstacle, wherein the predetermined detection condition comprises a condition that a voltage level of a reception signal of the ultrasonic wave received by the reception sensor is greater than a threshold voltage level.

* * * * *